Figure 1:
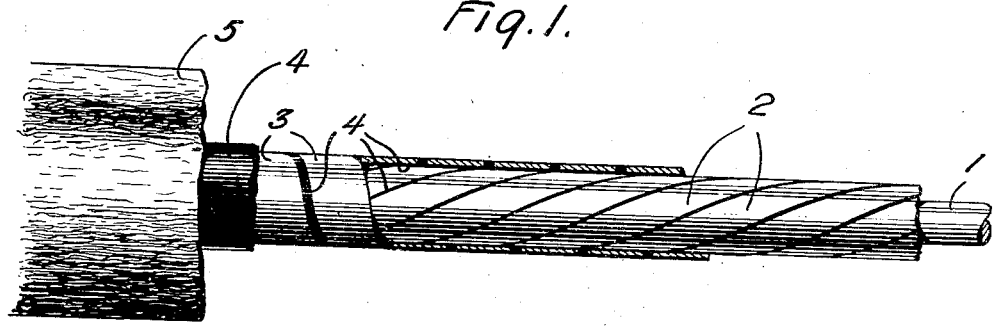

June 1, 1926.

O. E. BUCKLEY 1,586,875

CONTINUOUSLY LOADED SUBMARNE CABLE

Filed August 16, 1921

Inventor:
Oliver E. Buckley,
by Joel W. Palmer
Atty.

Patented June 1, 1926.

1,586,875

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

CONTINUOUSLY-LOADED SUBMARINE CABLE.

Application filed August 16, 1921. Serial No. 492,726.

This invention relates to continuously loaded submarine cables and more particularly to such cables in which the loading material employed exhibits high permeability at low magnetizing forces.

An object of the invention is to provide a cable construction such that the characteristics of the loading material will be retained after submergence in considerable depths of water.

Another object of the invention is to provide a method for insulating a loaded conductor in such a manner that the pressure applied to the loading tape when the cable is submerged will be uniform and that no strains or deformation in the loading material will result from the submergence of the cable to very great depths.

Other objects and features of the invention will appear from a consideration of the following description taken in conjunction with the accompanying drawing and the appended claims.

It has been found that where certain materials having high permeability at low magnetizing forces are utilized in continuously loaded submarine cables insulated in the ordinary manner, there is a tendency for the loading material to be deformed by the extremely high water pressure to which the cable is subjected upon submergence. This deformation causes the permeability of the loading material to be reduced due to mechanical strain in the loading material, the strain being introduced as a result of non-uniform pressure being applied to the loading tape when pressure is applied by the water to the insulated conductor.

That the permeability of magnetic materials will change when they are subjected to mechanical strains has long been well known, but with iron, which is the only material which has been used heretofore for loading submarine cables, the change in permeability has been found to be very small so long as the strain is within the elastic limit. For instance, it has been found that pure iron with an initial permeability of less than 200 when stretched under forces up to 20,000 pounds per square inch suffers a change of permeability less than 5%. On the other hand, compositions of nickel and iron which exhibit extraordinarily high permeability at low magnetizing forces have been found to be extremely sensitive to mechanical strain. For example, when a strip of alloy of 70% nickel and 30% iron was stretched under a force of 6,000 pounds per square inch, the permeability fell from the high initial value of 2,000 to a value of approximately 100, and a composition of 78½% nickel and 21½% iron with an initial permeability of about 3,500 was so modified by tension that with a force of 6,000 pounds per square inch its permeability dropped to less than 1,000, which, although still a high value compared to that ordinarily exhibited by iron, represents considerable impairment from the standpoint of its use as a loading material for submarine cables. In both these cases, and in fact in all cases which have been tried, it has been found that practically the original permeability is restored on release of the distorting force so long as the material has not been strained beyond its elastic limit, which, in the case of these compositions, is reached at a tension of the order of 45,000 pounds per square inch.

The ordinary method of insulating submarine telegraph and telephone conductors which are to be submerged at great depths, is to apply first to the conductor a coating of Chatterton's compound to give adhesion between the conductor and the gutta percha which is later applied. The Chatterton's compound is usually applied by drawing the conductor continuously through a bath of the hot compound just previous to its being drawn through the extruding machine which applies the gutta percha in one or more layers around the conductor. This method has been found to serve satisfactorily for submarine telephone conductors continuously loaded with iron wire and it has been found that in such a case the iron loading wire retains its magnetic permeability when the cable is submerged, as would be expected. It has been found, however, that when conductors loaded with nickel-iron compositions of high initial permeability are insulated in this standard manner and subjected to pressures comparable with those encountered at the bottom of the ocean, the inductance of the loaded conductor is greatly reduced. For a more complete description of these nickel-iron compositions reference is made to U. S. application of G. W. Elmen, Serial No. 473,877, filed May 31, 1921, and U. S.

application of O. E. Buckley, Serial No. 492,725, filed August 16, 1921. For example, a conductor loaded with 70% nickel and 30% iron in the form of a helical tape .006" thick and .125" wide and insulated in the ordinary manner with Chatterton's compound and gutta percha suffered a reduction of inductance from about 30 milhenries per nautical mile to less than 5 milhenries per nautical mile when the insulated conductor was subjected to a water pressure of 6,000 pounds per square inch. In another instance, a conductor loaded with 78½% nickel and 21½% iron of the same dimensions and insulated in the same manner suffered a reduction from about 60 milhenries per nautical mile to less than 20 milhenries under the same treatment. It will be noted that the changes in inductance suffered by the loaded conductors correspond roughly to the changes in permeability of the magnetic materials when subjected to the simple mechanical strain of tension. From this behavior it has been determined that the loss of inductance of the cables results from strains introduced as a result of non-uniform pressure being applied by the gutta percha to the loading material when uniform pressure is applied by the water to the gutta percha. The effect of the non-uniform pressure is to introduce strains of deformation in the loading material. That this is the case is further borne out by the fact that if the loaded conductor is subjected to pressure in a manner to insure uniform pressure being applied to the loading material, no observable change of inductance is produced.

The invention contemplates overcoming the tendency of the loading material to be deformed by pressure under service conditions by completely filling the interstices not only between the adjacent turns of the loading tape and between the tape and the conductor, but also between the strands of the conductor itself if the conductor be of the stranded type. To this end, it is preferable to employ an impregnating material which is fluid at temperatures and pressures commonly encountered in great depths of water. Such a material is the well-known Chatterton's compound which is composed of Stockholm tar, resin, and gutta percha. For this purpose, the compound should have a relatively large proportion of Stockholm tar so that its fluidity may be retained at the low temperatures encountered in the ocean. In order to apply the compound in such a manner that all the interstices of the loaded conductor will be filled, it has been found desirable to use the method of vacuum impregnation whereby the air is first removed from the interstices and the hot Chatterton's compound then forced into them by suitable pressure. As is well known to those skilled in the art, the common method of vacuum impregnation comprises placing the article to be impregnated in an air-tight container from which the air is then exhausted by a suitable air pump and then allowing the impregnating compound to flow into the container until the article is completely submerged and the interstices filled. The flow of compound into the container may then be shut off and pressure applied by pumping air into the container which serves to force the Chatterton's compound into the interstices of the loaded conductor in such a manner as to completely fill them. The conductor is then drawn from the bath of hot compound, the excess compound being allowed to drip off before the conductor passes into the extruding machine which applies the gutta percha.

It has previously been proposed to coat a bare conductor with Chatterton's compound before wrapping the iron wire around it, but this simply serves to protect the conductor from the ingress of water and does not serve the purposes of the present invention. Furthermore, this method is not applicable to the conductor loaded with magnetic material of high permeability of the type described, for the reason that this high permeability is best secured by a heat treatment process which is given the loaded conductor after the loading material has been applied. This heat treatment includes passing the loaded conductor through a furnace maintained at a temperature of approximately 900° C. Such a high temperature would destroy any known insulating material which is fluid under the conditions to which the cable is later to be subjected. Hence, the method of applying Chatterton's compound first and the loading material second is not suitable for filling the interstices of the conductor loaded with an alloy of high permeability which is sensitive to mechanical strain.

Figure 2:
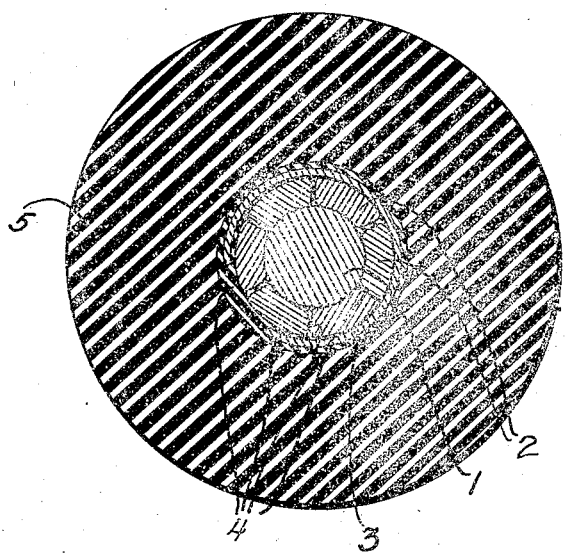

In the drawing, Fig. 1 is an elevation, part in plan and part in section, showing the loaded conductor in its preferred form; and Fig. 2 is a cross section of a cable made in accordance with the present invention.

Referring to the drawing, 1 is the central copper wire of the conductor surrounded by a plurality of helically applied segmental strips 2 which, together with the central wire 1, form the conductor, which is of the type commonly employed for long submarine cables. Surrounding the conductor is the loading material 3 which is preferably in the form of a helically applied tape wound closely around the stranded conductor. The Chatterton's compound 4 fills all the interstices of the conductor and loading material and also forms a thin layer outside the loading material, the whole being surrounded by the insulating medium 5 which is usually gutta percha. The structure illustrated forms the core of the cable which further comprises, in the ordinary case, layers of jute and armoring wires to give mechanical protection. While the application of the invention to a stranded conductor has been specifically described, it is to be understood that the invention is not limited to this type of conductor.

While specific mention has been made to a method of vacuum impregnation by a non-continuous process, it is not intended to limit the scope of the invention thereby as the compound may also be applied in a continuous manner by drawing the conductor continuously through an evacuated chamber wherein it passes through the fluid filling material, giving it a coating of this material, and thence into the open air or into a high pressure chamber wherein the filling material is forced into the interstices.

Furthermore, although a specific description has been given with reference to the use of Chatterton's compound and gutta percha, it is not intended to limit the scope of the invention to these particular materials. It has been found, for instance, that similar precautions need to be taken if the conductor is to be insulated with rubber instead of gutta percha and in this case, the filling material which serves to equalize pressure around the loading tape or wire should be one which is suitable from chemical and physical standpoints for use in connection with the rubber insulation.

What is claimed is:

1. A continuously loaded submarine conductor impregnated with a filling material which is fluid at the temperatures and pressures at which the conductor is to be used, the loading material being an alloy capable of having high permeability under favorable conditions but having materially reduced permeability when strained.

2. A submarine conductor, a layer of magnetic alloy capable of having high permeability surrounding said conductor in the form of spirally laid wire or tape, a layer of solid insulating material surrounding said alloy, and a layer of insulating material between said alloy and said conductor, said last mentioned material being capable of flowing at the temperatures and pressures existing at ocean depths.

3. A continuously loaded submarine conductor impregnated under vacuum with a filling material which is capable of flowing at the temperatures and pressures at which the conductor is to be used, the loading material being an alloy capable of having high permeability under favorable conditions but having materially reduced permeablity when strained.

4. A submarine conductor, a layer of magnetic alloy comprising nickel and iron and capable of having high permeability surrounding said conductor in the form of spirally laid wire or tape, a layer of solid insulating material surrounding said alloy, and insulating material of a fluid nature adjacent said alloy capable of transmitting applied forces equally in all directions at the temperatures and pressures existing at ocean depths.

5. A submarine cable conductor having a smooth cylindrical surface, a layer of magnetic material surrounding said conductor and capable of having high permeability under favorable conditions but having materially reduced permeability when strained, and insulating material adjacent said magnetic material, said insulating material being capable of transmitting pressure equally in all directions at the temperatures and pressures existing at ocean depths.

6. A submarine conductor, a layer of magnetic material capable of having high permeability surrounding said conductor in the form of spirally laid wire or tape, a layer of solid insulating material surrounding said magnetic material, and insulating material of a fluid nature at the temperatures and pressures at which the conductor is to be used forming a body underneath said wire or tape and in the spaces between contiguous turns thereof in contact with said layer of solid insulating material, said insulating materials being of a nature not to deleteriously affect each other.

7. A submarine cable core comprising a continuously loaded conductor impregnated with a filling substance, which also surrounds the loaded conductor in a thin layer, said filling substance assisting in relieving the magnetic material from strains when submerged, the loading material being capable of having materially larger permeability under conditions of no strain than when strained, and a layer of insulating material disposed about said filling substance.

8. A continuously loaded submarine cable comprising a composite conductor having a smooth cylindrical surface, and a layer of magnetic material disposed thereabouts and impregnated with a filling material under vacuum.

9. A cable comprising a conductor, a layer of magnetic material surrounding said conductor, a pressure equalizing medium surrounding said magnetic material and a layer of insulating material surrounding said pressure equalizing medium.

10. The combination with a submarine conductor of a surrounding layer of magnetic material, the permeability of which is subject to greater changes than that of iron when the material is strained, and a pressure equalizing medium surrounding said magnetic material to at least partially equalize differences in pressures to which different parts of the magnetic material are subjected in use.

11. The combination with a submarine conductor of a surrounding layer of magnetic material which has been given higher permeability than iron at low magnetizing forces by being heat treated on the conductor, and insulating material adjacent said magnetic material, said insulating material being capable of transmitting pressure equally in all directions at the temperatures and pressures to which a submarine cable is subjected.

12. The method of manufacturing a continuously inductively loaded signaling conductor to be subjected to low temperatures and high pressures such as obtain at ocean depths, which comprises wrapping the conductor with loading material in the form of wire or tape, subjecting the loaded conductor to a heat treatment to develop high permeability in the loading material, and subsequently impregnating the loaded conductor with viscous material which will transmit pressure equally in all directions when subjected to said low temperatures and high pressures.

13. The method of manufacturing a continuously loaded submarine conductor, which comprises applying magnetic material to the conductor, heat treating the loaded conductor to secure the desired inductance, impregnating the loaded conductor with a viscous substance, and subsequently applying an insulating covering.

14. The method of manufacturing a continuously loaded submarine conductor, which comprises applying magnetic material to the conductor, heat treating the loaded conductor to secure the desired inductance, impregnating and coating the loaded conductor with a substance which will assist in relieving the magnetic material from strains when the conductor is submerged, and subsequently applying an insulating covering.

15. The method of manufacturing a continuously loaded submarine conductor which comprises applying the magnetic material to the conductor, heat treating the loaded conductor to secure the desired inductance, vacuum impregnating the loaded conductor with a viscous compound, and subsequently applying an insulating covering.

In witness whereof, I hereunto subscribe my name this 10th day of August A. D., 1921.

OLIVER E. BUCKLEY.